US009485271B1

(12) United States Patent
Roundy et al.

(10) Patent No.: US 9,485,271 B1
(45) Date of Patent: Nov. 1, 2016

(54) SYSTEMS AND METHODS FOR ANOMALY-BASED DETECTION OF COMPROMISED IT ADMINISTRATION ACCOUNTS

(71) Applicant: Symantec Corporation, Mountain View, CA (US)

(72) Inventors: Kevin Roundy, El Segundo, CA (US); Sandeep Bhatkar, Sunnyvale, CA (US); Fanglu Guo, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 22 days.

(21) Appl. No.: 14/205,335

(22) Filed: Mar. 11, 2014

(51) Int. Cl.
*H04L 29/06* (2006.01)

(52) U.S. Cl.
CPC .................. *H04L 63/1441* (2013.01)

(58) Field of Classification Search
CPC . H04L 63/20; H04L 63/1425; H04L 63/102; H04L 63/1441; H04L 63/1408; H04L 63/1483; H04L 67/22; H04L 63/08; H04L 63/105; H04L 63/10; H04L 12/4641; H04L 41/0893; H04L 63/0272; H04L 63/162; H04L 67/1097; H04L 12/56; H04L 12/4675; H04L 29/12226; H04L 29/12245; G06F 2221/2101; G06F 2221/2115; G06F 2221/0737; G06F 21/552; G06F 21/30–21/32; G06F 21/46
USPC ............................................ 726/5–7, 23, 25
See application file for complete search history.

(56) References Cited

U.S. PATENT DOCUMENTS

| 7,979,494 | B1 * | 7/2011 | Golovin ................ G06F 21/552 709/206 |
| 8,146,160 | B2 * | 3/2012 | Orr et al. ......................... 726/23 |
| 2001/0032181 | A1 * | 10/2001 | Jakstadt et al. .................. 705/40 |
| 2004/0049693 | A1 * | 3/2004 | Douglas .............. H04L 63/1408 726/23 |
| 2004/0210776 | A1 * | 10/2004 | Shah et al. ..................... 713/202 |
| 2005/0198537 | A1 * | 9/2005 | Rojewski ....................... 713/202 |
| 2006/0026682 | A1 * | 2/2006 | Zakas ............................. 726/22 |
| 2006/0150249 | A1 * | 7/2006 | Gassen et al. .................. 726/23 |

(Continued)

OTHER PUBLICATIONS

Mahmood K. Ibrahim, Mohammed A.J. Hamid : "Secure e-government framework: design and implementation"—LJCSET, May 2013, vol. 3, Issue 5, pp. 186-193.*

(Continued)

*Primary Examiner* — Catherine Thiaw
(74) *Attorney, Agent, or Firm* — ALG Intellectual Property, LLC

(57) ABSTRACT

A computer-implemented method for anomaly-based detection of compromised information technology (IT) administration accounts may (1) include establishing a set of permissible IT administration tasks for an IT administration account, (2) monitoring the IT administration account for activities outside the set of permissible IT administration tasks, (3) detecting a suspicious activity by identifying an activity that is outside the set of permissible IT administration tasks and therefore indicative of the IT administration account being compromised, and (4) in response to detecting the suspicious activity, performing a security action with respect to the potentially compromised IT administration account. Various other methods, systems, and computer-readable media are also disclosed.

20 Claims, 7 Drawing Sheets

(56) References Cited

U.S. PATENT DOCUMENTS

| | | | |
|---|---|---|---|
| 2007/0192720 A1* | 8/2007 | Alsup | G06F 3/0486 715/769 |
| 2007/0214497 A1* | 9/2007 | Montgomery | G06F 21/6218 726/4 |
| 2009/0150677 A1* | 6/2009 | Vedula et al. | 713/183 |
| 2009/0222907 A1* | 9/2009 | Guichard | G06F 21/6227 726/17 |
| 2009/0265777 A1* | 10/2009 | Scott | 726/11 |
| 2010/0070776 A1* | 3/2010 | Raman | G06F 21/552 713/189 |
| 2010/0205179 A1* | 8/2010 | Carson et al. | 707/740 |
| 2010/0306832 A1* | 12/2010 | Mu et al. | 726/5 |
| 2012/0224057 A1* | 9/2012 | Gill et al. | 348/143 |
| 2013/0019320 A1* | 1/2013 | Ericsson | G06F 21/62 726/28 |
| 2013/0054422 A1* | 2/2013 | DeSouza | G06Q 30/00 705/27.1 |
| 2013/0268911 A1* | 10/2013 | Charfi | G06Q 10/06 717/105 |
| 2013/0282904 A1* | 10/2013 | Marlow | H04L 63/04 709/225 |
| 2014/0165195 A1* | 6/2014 | Brdiczka et al. | 726/23 |
| 2014/0188548 A1* | 7/2014 | Long | G06F 21/55 705/7.28 |
| 2015/0101053 A1* | 4/2015 | Sipple | 726/24 |
| 2015/0121461 A1* | 4/2015 | Dulkin | H04L 63/1408 726/4 |
| 2015/0222604 A1* | 8/2015 | Ylonen | H04L 63/062 713/171 |

OTHER PUBLICATIONS

Mark G. Sobell : "A pratical guide to the Unix system", 3rd Edition, Addison-Wesley, 1995, Excerpts pp. 492-493.*

IU (Indiana University): "Windows: end-user security—What you don't know can hurt you"—Learning Technologies division of University Iformation Technology Services, Sep. 2009, 7 pages.*

Tyler Brewer "Differences amon Standard, Administrator and Guest Users" Jan. 29, 2013, 3 pages, retrieved from http://www.anvisoft.com/resources/differences-among-standerd-adminstrator-and-guest-users/ on Mar. 18, 2016.*

Pannell, Grant et al., "Anomaly Detection over User Profiles for Intrusion Detection", Proceedings of the 8th Australian Information Security Management Conference, Perth Western Australia, (Nov. 30, 3010), pp. 80-94.

James P. Anderson Co., "Computer Security Threat Monitoring and Surveillance", Washington, PA, (Feb. 26, 1980).

Yampolskiy, Roman V., et al., "Behavioural biometrics: a survey and classification", Int. J. Biometrics, vol. 1, No. 1, Inderscience Enterprises Ltd., (2008), pp. 81-113.

Cheung, David W., et al., "Discovering User Access Patterns on the World-Wide Web", (1998).

Cockburn, Andy et al., "What Do Web Users Do? An Empirical Analysis of Web Use", Int. J. Human-Computer Studies, Academic Press, (2000).

Tan, K., "The application of neural networks to UNIX computer security", 1995 IEEE International Conference on Neural Networks , vol. 1, Perth, WA, (Nov./Dec. 1995), pp. 476-481.

Lane, Terran et al., "An Application of Machine Learning to Anomaly Detection", (Feb. 14, 1997).

Balajinath, B. et al., "Intrusion detection through learning behavior", Computer Communications, vol. 24, Issue 12, Elsevier Science B.V., (Jul. 15, 2001), pp. 1202-1212.

Shavlik, Jude et al., "Selection, Combination, and Evaluation of Effective Software Sensors for Detecting Abnormal Computer Usage", KDD'04, ACM, Seattle, Washington, (Aug. 22-25, 2004).

Ling, Li et al., "Windows NT User Profiling for Masquerader Detection", Proceedings of the 2006 IEEE International Conference on Networking, Sensing and Control, 2006. ICNSC '06., (2006), pp. 386-391.

McKinney, Steve et al., "User Identification Via Process Profiling [Extended Abstract]", CSIIRW, ACM, Oak Ridge, Tennessee, (Apr. 13-15, 2009).

Revett, Kenneth, "A bioinformatics based approach to user authentication via keystroke dynamics", International Journal of Control, Automation and Systems, Institute of Control, Robotics and Systems and The Korean Institute of Electrical Engineers, (Feb. 1, 2009), pp. 7-15.

Freeman, Seth et al., "Host-Based Intrusion Detection Using User Signatures", Walter Lincoln Hawkins Graduate Research Conference, Rennselaer, Troy, NY, (Oct. 2002).

Perman, Larisa, "Anomaly Intrusion Detection Based on User's Behavior Profiling", M.S. Computer Science Project Proposal, Rochester Institute of Technology, Department of Computer Science, Rochester, NY, (Aug. 28, 2003).

Imsand, E.S. et al., "Masquerade Detection through GUIID", IEEE GLOBECOM 2008, New Orleans, LA, (Nov. 30-Dec. 4, 2008).

Smaha, Stephen E., "Haystack: An Intrusion Detection System", Fourth Aerospace Computer Security Applications Conference, 1988, Orlando, FL, (1988), pp. 37-44.

"McAfee Endpoint Protection—Advanced Suite", http://www.mcafee.com/us/products/endpoint-protection-advanced-suite.aspx, as accessed Jan. 22, 2014, McAfee, Inc., (Dec. 17, 2010).

* cited by examiner

SYSTEMS AND METHODS FOR ANOMALY-BASED DETECTION OF COMPROMISED IT ADMINISTRATION ACCOUNTS

BACKGROUND

Each user on a network may be assigned a user account that provides the user with access to a computing device and/or various network applications and services. A user's account may allow a network to authenticate a user and may enable the user to access the network's applications and services. Typically, each user may be authenticated by logging into a user account using passwords or other credentials; once authenticated, each user may be authorized to access different applications, services, or other resources on the network.

An information technology (IT) administrator (e.g., a network administrator) using an IT administration account (e.g., a network administrator account) may have greater access to network applications, services, machines, or other resources than a typical user. As accounts with high-level privileges, IT administration accounts may be high-value targets for attackers to gain access to highly sensitive or confidential information, such as financial information, defense-related information, and/or intellectual property (e.g., source code), and/or to simply disrupt an entity's operations. Accordingly, the instant disclosure identifies and addresses a need for detecting compromised IT administration accounts.

SUMMARY

As will be described in greater detail below, the instant disclosure generally relates to systems and methods for anomaly-based detection of compromised IT administration accounts by monitoring IT administration accounts for suspicious activities outside a set of permissible IT administration tasks normally used by legitimate IT administrators. These suspicious activities outside a set of permissible IT administration tasks may be indicative of a potentially compromised IT administration account; thus, a security action (e.g., alerting an IT administrator or locking out the account at a specified computer) may be performed to protect the network and/or enterprise from the potentially compromised IT administration account.

In one example, a computer-implemented method for anomaly-based detection of compromised IT administration accounts may include (1) establishing a set of permissible IT administration tasks for an IT administration account (e.g., a local administrator account or a domain administrator account), (2) monitoring the IT administration account for activities outside the set of permissible IT administration tasks, (3) detecting a suspicious activity by identifying an activity that is outside the set of permissible IT administration tasks and therefore indicative of the IT administration account being compromised, and (4) in response to detecting the suspicious activity, performing a security action with respect to the potentially compromised IT administration account.

In some embodiments, the operation of establishing the set of permissible IT administration tasks may include (1) logging a history of performed IT administration tasks on the IT administration account by a particular type of computing device and (2) dynamically establishing the set of permissible IT system administration tasks based on a volume of the logged history of IT administration tasks for the particular type of computing device.

In some embodiments, the operation of establishing the set of permissible IT administration tasks may include (1) learning statistical properties about the IT administration account and (2) based on the statistical properties, establishing the set of permissible IT administration tasks and deviation thresholds on the set of permissible IT administration tasks indicative of the IT administration account being compromised. The statistical properties may include (i) a number of logins per day into the IT administration account, (ii) times of day of the logins occur, (iii) a set of geographical locations of the logins, (iv) a number of machines accessed per day by the IT administration account, (v) a volume of hypertext transfer protocol (HTTP) traffic from the IT administration account, and/or (vi) a set of applications, tools, and/or commands used by an IT administrator on the IT administration account. The operation of detecting the suspicious activity may include identifying the suspicious activity by identifying one or more activities that exceed one or more deviation thresholds (e.g., number of logins per day) for the set of permissible IT administration tasks.

In some embodiments, the operation of establishing the set of permissible IT administration tasks may include (1) determining suspicious activities on the IT administration account that can compromise the IT administration account and (2) excluding the suspicious activities from the set of permissible IT administration tasks for the IT administration account.

In some embodiments, the operation of establishing the set of permissible IT administration tasks may include (1) identifying a false positive security action that was triggered by a particular activity that is outside the set of permissible IT administration tasks, (2) determining that the particular activity is a permissible IT administration task, and (3) adding the particular activity to the set of permissible IT administration tasks for the IT administration account.

In some embodiments, the operation of establishing the set of permissible IT administration tasks may include (1) establishing a set of permissible tools to perform the permissible IT administration tasks and/or (2) establishing a set of impermissible tools to perform the permissible IT administration tasks.

In some embodiments, the operations of monitoring the IT administration account, detecting the suspicious activity, and/or performing the security action may include performing the security action prior to executing the activities that can potentially compromise the IT administration account.

In some embodiments, the IT administration account may include a local administrator account (where the set of permissible IT administration tasks includes tasks for workstation support) or a domain administrator account (where the set of permissible IT administration tasks includes tasks for server support).

In some embodiments, the operation of performing a security action may include (1) alerting a network entity of the suspicious activity on the potentially compromised IT administration account, (2) sending a message to an IT administrator about the suspicious activity on the potentially compromised IT administration account, (3) locking out the IT administration account at a specified computing device or at non-administrator computing devices based on the suspicious activity, (4) blocking execution of the suspicious activity, and/or (5) logging the suspicious activity for the potentially compromised IT administration account on a profiling server. In such embodiments, the suspicious activity may include clearing an event log, creating a temporary user account, changing a privilege level of another user or resetting a password of the other user.

In some embodiments, the computer-implemented method for anomaly-based detection of compromised IT administration accounts may also include (1) retrieving a non-administrator user account credential for a user of the IT administration account, (2) retrieving an IT administration account credential for the user of the system administration account, (3) comparing a credential hash of the non-administrator user account credential with the IT administration account credential, (4) determining that the credential hash of the non-administrator user account credential and the IT administration account credential are the same, and (5) in response to the determination that the credential hash of the non-administrator user account credential and the IT administration account credential are the same, performing a security action by prompting a change in the non-administrator user account credential or the IT administration account credential so the account credentials are different to protect the IT administration account.

In some embodiments, the activity that is outside the set of permissible IT administration tasks may include (1) accessing, copying, or downloading a confidential document and/or source-code, (2) reading an email, (3) composing a document, (4) accessing the Internet, (5) remote accessing another computing device from a non-administrator computing device, (6) creating a temporary account and/or a temporary user account, (7) raising and/or changing a privilege level of another user, (8) clearing an event log, and/or (9) resetting passwords of other users.

In some embodiments, the IT administrator account may include a local administrator account, a domain administrator account, a network administrator account, a system administrator account, a database administrator account, and/or a backup administrator account. The set of permissible IT administration tasks may include creating and/or modifying new user accounts, installing software, host administration, network administration, maintaining network resources, hosting a website, and/or managing domain credentials. The monitored activities may include commands, applications, and/or tools executed on the IT administration account.

In one embodiment, a system for implementing the above-described method may include (1) an establishing module, stored in memory, that establishes a set of permissible IT administration tasks for an IT administration account, (2) a monitoring module, stored in memory, that monitors the IT administration account for activities outside the set of permissible IT administration tasks, (3) a detection module, stored in memory, that detects a suspicious activity by identifying an activity that is outside the set of permissible IT administration tasks and therefore indicative of the IT administration account being compromised, (4) a security action module, stored in memory, that in response to detecting the suspicious activity, performs a security action with respect to the potentially compromised IT administration account, and (5) at least one physical processor that executes the establishing module, the monitoring module, the detection module, and the security action module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) establish a set of permissible IT administration tasks for an IT administration account, (2) monitor the IT administration account for activities outside the set of permissible IT administration tasks, (3) detect a suspicious activity by identifying an activity that is outside the set of permissible IT administration tasks and therefore indicative of the IT administration account being compromised, and (4) in response to detecting the suspicious activity, perform a security action with respect to the potentially compromised IT administration account.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
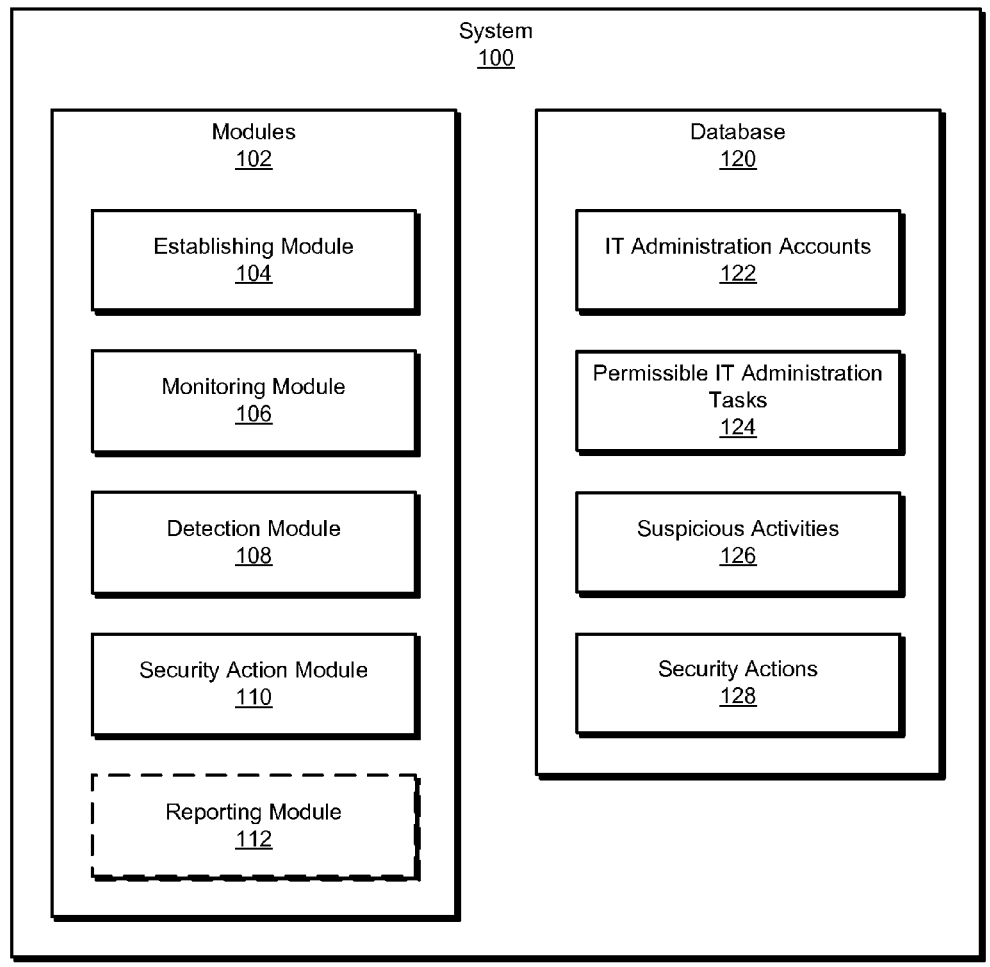
FIG. 1 is a block diagram of an exemplary system for anomaly-based detection of compromised IT administration accounts.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for anomaly-based detection of compromised information technology (IT) administration accounts. As will be explained in greater detail below, by establishing a set of tasks permitted for IT administration accounts (e.g., domain-administrator accounts or local-administrator accounts), an activity not within the set of tasks typical for network administration using the IT administration accounts may be detected as an anomaly (or suspicious activity). The detected anomaly may indicate that the network administrator account has been compromised. A security action (e.g., alerting an IT administrator or locking out the account at a specified computer) may be performed on the IT administration account based on the detected anomaly to protect the network and/or enterprise from further attacks. Embodiments of the instant disclosure may also provide various other advantages and features, as discussed in greater detail below.

Figure 2:
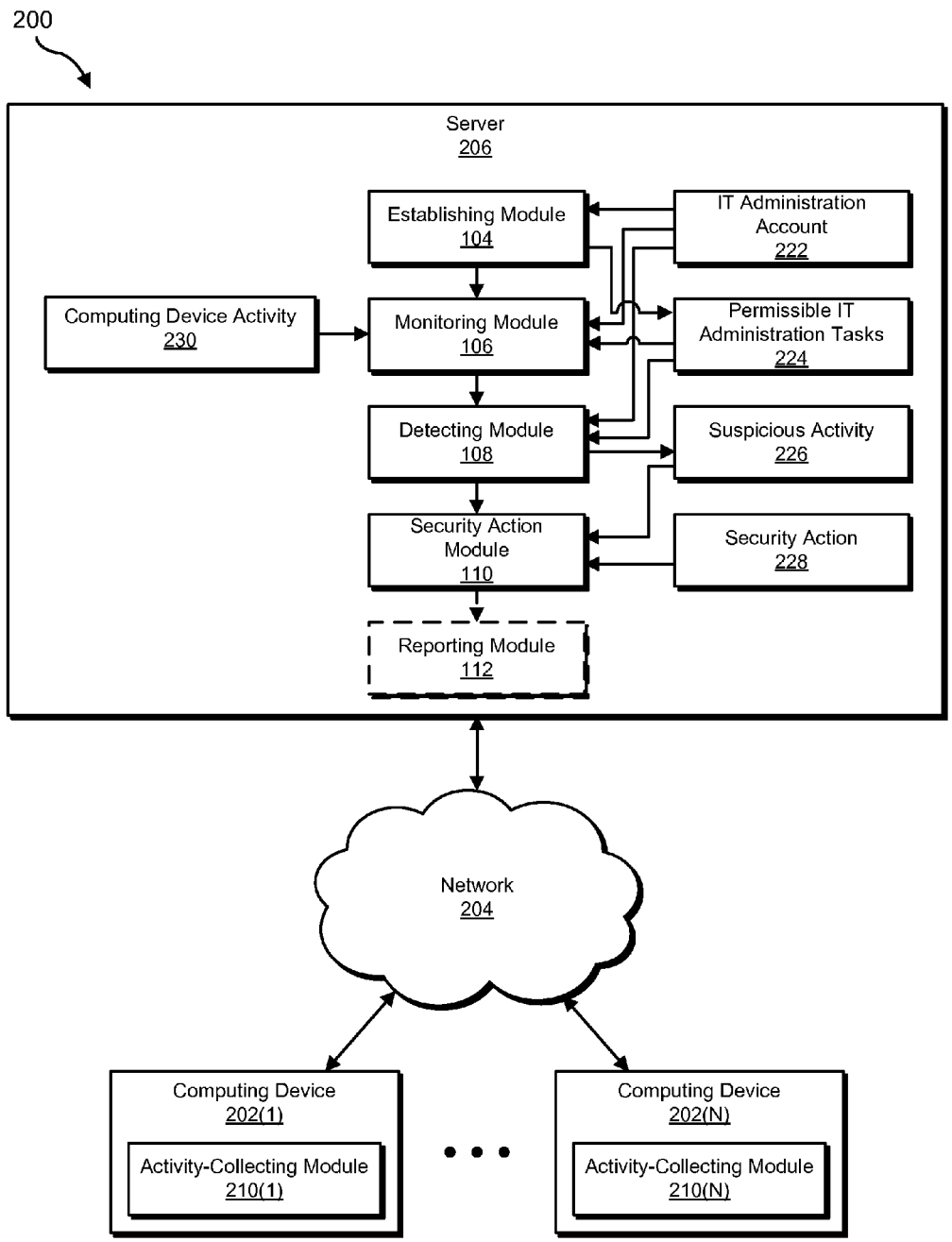
FIG. 2 is a block diagram of an additional exemplary system for anomaly-based detection of compromised IT administration accounts.

The following will provide, with reference to FIGS. 1-2, detailed descriptions of exemplary systems for anomaly-based detection of compromised IT administration accounts. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for anomaly-based detection of compromised IT administration accounts. As illustrated in this figure, exemplary system 100 may include one or more modules 102 for performing one or more tasks. For example, and as will be explained in greater detail below, exemplary system 100 may include an establishing module 104 that establishes a set of permissible IT administration tasks for an IT administration account. Exemplary system 100 may also include a monitoring module 106 that monitors the IT administration account for activities outside the set of permissible IT administration tasks.

In addition, and as will be described in greater detail below, exemplary system 100 may include a detection module 108 that detects a suspicious activity by identifying an activity that is outside the set of permissible IT administration tasks and therefore indicative of the IT administration account being compromised. Exemplary system 100 may also include a security action module 110 that, in response to detecting the suspicious activity, performs a security action with respect to the potentially compromised IT administration account. Exemplary system 100 may further include a reporting module 112 that alerts a network entity of the suspicious activity on the potentially compromised IT administration account, sends a message to an IT administrator about the suspicious activity on the potentially compromised IT administration account, and/or logs the suspicious activity for the potentially compromised IT administration account on a profiling server. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information about one or more IT administration accounts (e.g., IT administration accounts 122), information about one or more permissible IT administration tasks (e.g., permissible IT administration tasks 124), information about one or more suspicious activities (e.g., suspicious activities 126), and/or information about one or more security actions (e.g., security actions 128).

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include one or more of computing devices 202(1)-(N) in communication with a server 206 via a network 204. In one example, one or more of computing devices 202(1)-(N) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing devices 202(1)-(N) and/or server 206, enable computing devices 202(1)-(N) and/or server 206 to provide anomaly-based detection of compromised IT administration accounts to protect the network from attacks using the potentially compromised IT administration account. For example, and as will be described in greater detail below, one or more of modules 102 may cause computing devices 202(1)-(N) and/or server 206 to provide anomaly-based detection of compromised IT administration accounts. For example, establishing module 104 on server 206 may be programmed to establish a set of permissible IT administration tasks 224 for IT administration account 222. Monitoring module 106 on server 206 may be programmed to monitor IT administration account 222 for activities outside the set of permissible IT administration tasks 224. In some examples, monitoring module 106 on server 206 may monitor IT administration account 222 by communicating with activity-collecting modules 210(1)-(N) on computing devices 202(1)-(N). Detection module 108 on server 206 may be programmed to detect suspicious activity 226 by identifying an activity that is outside the set of permissible IT administration tasks 224 and therefore indicative of IT administration account 222 being compromised. Security action module 110 on server 206 may be programmed to, in response to detecting suspicious activity 226, perform security action 228 with respect to the potentially compromised IT administration account. Reporting module 112 on server 206 may be programmed to alert a network entity of suspicious activity 226 on the potentially compromised IT administration account, send a message to an IT administrator about suspicious activity 226 on the potentially compromised IT administration account, and/or log suspicious activity 226 for the potentially compromised IT administration account on a profiling server. The profiling server may learn behavior patterns of the IT administrator and/or detect anomalies on the IT administration account.

Computing devices 202(1)-(N) generally represents any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. As illustrated in FIG. 2, one or more of activity-collecting modules 210(1)-(N) may detect, log, and/or transmit information about suspicious activities (e.g., to server 206).

Server 206 generally represents any type or form of computing device that is capable of reading computer-executable instructions. Examples of server 206 include, without limitation, application servers and database servers configured to provide various database services and/or run certain software applications. As illustrated in FIG. 2, server 206 may provide network and end-point administration services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing devices 202(1)-(N) and server 206.

Figure 3:
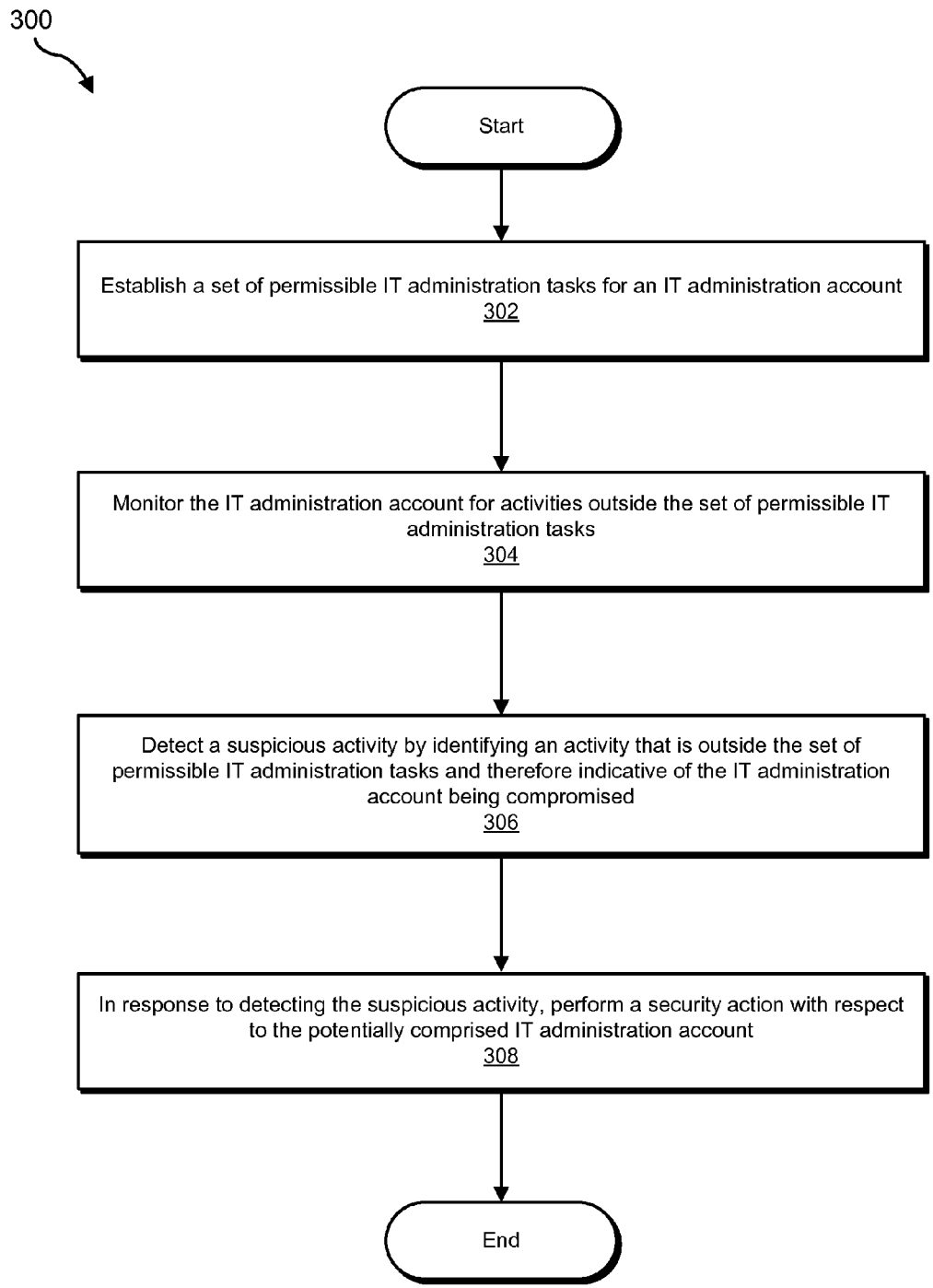
FIG. 3 is a flow diagram of an exemplary method for anomaly-based detection of compromised IT administration accounts.

FIG. 3 is a flow diagram of an exemplary computer-implemented method 300 for anomaly-based detection of compromised IT administration accounts. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may establish a set of permissible IT administration tasks for an IT administration account. For example, establishing module 104 may, as part of server 206 and/or computing devices 202(1)-(N) in FIG. 2, establish a set of permissible IT administration tasks 224 for an IT administration account 222.

The phrase "IT administration account," as used herein, generally refers to any account with access to domains, networks, databases, computing systems, and/or computing devices that has higher-level privileges, rights, and/or access than a typical user account. For example, an IT administration account may be used by an IT administrator to maintain and upgrade computing devices, machines, and equipment in an enterprise network and/or any other type of network. An IT administration account may be assigned to an IT administrator with account credentials, such as a user name and password. In some examples, other types of account credentials may also be used.

IT administration accounts may be managed by any type of IT administrator, including local administrators, domain administrators, network administrators, system administrators, database administrators, and/or backup administrators. In some examples, a local administrator may manage endpoints (e.g., computing devices). A domain administrator may manage a website, manage domain credentials, and/or maintain other network resources (e.g., a domain name system) for an enterprise or other entity. As used herein, the phrase "domain name system" generally refers to a hierarchical distributed naming system for computers, services, or any resource connected to the Internet or a private network.

A network administrator may be responsible for the maintenance of computer hardware and software systems that make up a computer network. Network administration tasks may include the maintenance and monitoring of an active data network or converged infrastructure and related network equipment. For example, a network administrator may ensure integrity of network components within a company's LAN/WAN infrastructure. Similarly, a system administrator may be responsible for the upkeep, configuration, and reliable operation of computer systems, especially multi-user computers, such as servers. Additionally, a database administrator may be responsible for installation, configuration, upgrade, administration, monitoring, maintenance, securing of databases in an organization. A database administrator may provide the development and design of database strategies, system monitoring and improving database performance and capacity, and planning for future expansion requirements. A backup administrator may provide copying and archiving of computer data so the computer data may be used to restore the original data after a data loss event.

Within an IT administration account, an IT administrator may be an exceptionally powerful user with greater privileges, rights, and/or access to enterprise resources than a typical user. In some examples, an IT administrator using an IT administration account may have unrestricted access to the networks, servers, and/or resources of an enterprise. Because IT administration accounts may have greater privileges, rights, and/or access to enterprise resources than typical user accounts, IT administration accounts may be high-value targets for attackers, such as an advanced persistent threat (APT) attacker, who may compromise the IT administration accounts and/or gain access to the enterprise resources. The term "attacker," as used herein, generally refers to any individual or entity with the intent to gain unauthorized access to enterprise resources, such as networks, servers, and/or domains. An attacker may attempt to obtain the IT administrator credentials used to access an IT administration account. Once the attacker obtains the credentials and gains access to the IT administration account, the attacker may perform harmful activities, such as accessing, copying, and/or downloading a confidential document and/or source-code, creating a temporary account and/or a temporary user account for access to the enterprise resources after an attack has been discovered and/or IT administration account credentials have been changed, raising and/or changing a privilege level of another user to create other accounts with greater rights and privileges, clearing an event log to prevent prior activities from being viewed, or resetting passwords of other users to lock users out of accounts.

Fortunately, the actions performed by an attacker or even a non-administrator user (either a typical user or an IT administrator acting as a typical user) may differ from the typical, legitimate tasks performed by an IT administrator carrying out IT administrator tasks. The systems and methods described herein may use these differences in behavior between attackers or users and authentic IT administrators to identify attacks and protect IT administration accounts.

Although an IT administration account may allow an IT administrator to perform a wide range of activities, in practice the authorized IT administrator with normal behavior may perform a narrow set of IT administration tasks with a defined set of commands, applications, and/or tools. For example, a local administrator may perform tasks for workstation support and a domain administrator may perform tasks for server support. In some examples, an IT administrator may have multiple accounts, including a personal user account. An IT administrator may use an IT administration account for IT administrator tasks and may use a personal user account for other user activities, such as reading emails, surfing the Web, and/or copying, downloading, and/or composing a document.

Attackers often manifest a behavior quite different from authorized IT administrators. For example, an attacker using IT administration account credentials may explore multiple machines and may access, copy, and/or download highly sensitive or confidential information, such as source code. In some situations, an attacker using IT administration account credentials may execute or download low-prevalence files (e.g., files that are uncommon or typically not found at all within a community or enterprise).

Thus, tasks or activities on the IT administration account that occur outside a set of tasks normally performed by an authorized IT administrator may be considered an anomaly and may indicate misuse of the IT administration account and/or that the IT administration account has been compromised by an attacker. Once these anomalies are detected, they may be deemed suspicious activities and may be blocked and/or may trigger a security alert.

In order for anomalies and/or suspicious activities to be detected, establishing module 104 may define or otherwise establish permissible IT administration tasks on an IT administration account. The phrase "permissible IT administration tasks," as used herein, generally refers to tasks normally performed by authorized IT administrators while fulfilling their responsibilities as IT administrators, such as creating and/or modifying new user accounts, installing software, host administration, network administration, maintaining network resources, hosting a website, and/or managing domain credentials. A set of permissible IT administration tasks may be established statically, dynamically, or in any other suitable manner.

A set of permissible IT administration tasks may be established statically through a predefined white list or black list. A white list may be a list or register of permissible tasks on an IT administration account that are not indicative of suspicious activities on an IT administration account. Only those tasks or activities on a white list may be permissible on an IT administration account. A blacklist may be a list or register of specifically identified tasks that are impermissible on an IT administration account and/or that are indicative of an IT administration account being compromised.

A set of permissible IT administration tasks may be established dynamically by monitoring, logging, and/or tracking actual tasks, activities, and/or data on an IT administration account. For example, establishing module 104 may establish a set of permissible IT administration tasks for an IT administration account by logging a history of performed IT administration tasks on an IT administration account by a particular type of computing device. After logging a history, establishing module 104 may dynamically establish a set of permissible IT administration tasks based on a volume of the logged history of IT administration tasks for a particular type of computing device. An actual history of performed IT administration tasks for an organization or enterprise may be used to customize the set of permissible IT administration tasks to the unique activities performed by IT administrators for the organization or enterprise.

Establishing module 104 may create and/or identify sets of permissible IT administration tasks based on a variety of different factors, including IT administration account types, device types, locations where tasks are performed, times when tasks are performed, and/or any other suitable factor. For example, when an IT administration account is set up as a local administrator account, a set of permissible IT administration tasks may include tasks for workstation support. When an IT administration account is set up as a domain administrator account, a set of permissible IT administration tasks may include tasks for server support.

Permissible IT administration tasks may also be categorized by the type of computing device used by an IT administrator. For example, during the ordinary course of business, an IT administrator may access an IT administration account from an administrator computing device at specified and/or known locations within an enterprise. Occasionally, an IT administrator may use other non-administrator computing devices to perform IT administration tasks, such as tasks performed during an emergency and/or maintenance or support performed outside normal work hours. Permissible IT administration tasks performed during working hours (or normal business hours) and/or at an administrator computing device may differ from tasks performed during non-working hours and/or at a non-administrator computing device. For example, because an IT administrator may perform a majority of their tasks during normal working hours at an administrator computing device, the number of permissible IT administration tasks permitted during normal working hours and/or at an administrator computing device may be larger than a number of permissible IT administration tasks permitted during non-working hours and/or at a non-administrator computing device when an IT administrator may perform fewer tasks. Thus, permissible IT administration tasks can be categorized based on a type of computing device (e.g., a non-administrator computing device or an administrator computing device). In some examples, permissible IT administration tasks may also vary based on other situations and circumstances, such as a location of the computing device or time of day.

In some examples, a legitimate activity that is not included in a set of permissible IT administration tasks may be erroneously categorized or identified as a suspicious activity, which may trigger a false positive security action, a false positive error, and/or a false alarm. For example, establishing module 104 may establish a set of permissible IT administration tasks for an IT administration account that does not include a particular, legitimate activity. Thus, a legitimate activity may trigger a false positive security action. Based on feedback due to a false positive security action, establishing module 104 may determine that a legitimate activity is a permissible IT administration task and may add that legitimate activity to a set of permissible IT administration tasks, which may reduce a number of future false positives triggered for an IT administration account.

In some examples, an IT administrator may provide feedback on false positives. Prior to correcting an erroneous categorization of a legitimate activity, a legitimate activity (triggering a false positive error on an IT administration account) may be excluded from a white list (or included on a blacklist). In such cases, a legitimate activity may be added to the set of permissible IT administration tasks for a white list (or removed from a blacklist) so the legitimate activity does not continue to trigger a false positive suspicious activity and/or a false positive security action.

In another example, a set of permissible IT administration tasks may include various permissible applications and/or tools. For example, establishing a set of permissible IT administration tasks may include establishing a set of permissible applications and/or tools to perform the permissible IT administration tasks (i.e., a white list) and/or establishing a set of impermissible tools to perform the permissible IT administration tasks (i.e., a blacklist). In some examples, the set of permissible and impermissible tools to perform the set of permissible IT administration tasks may be specified by various situations and circumstances, such as type of computing device, a location of the computing device, and/or time of day.

Figure 4:
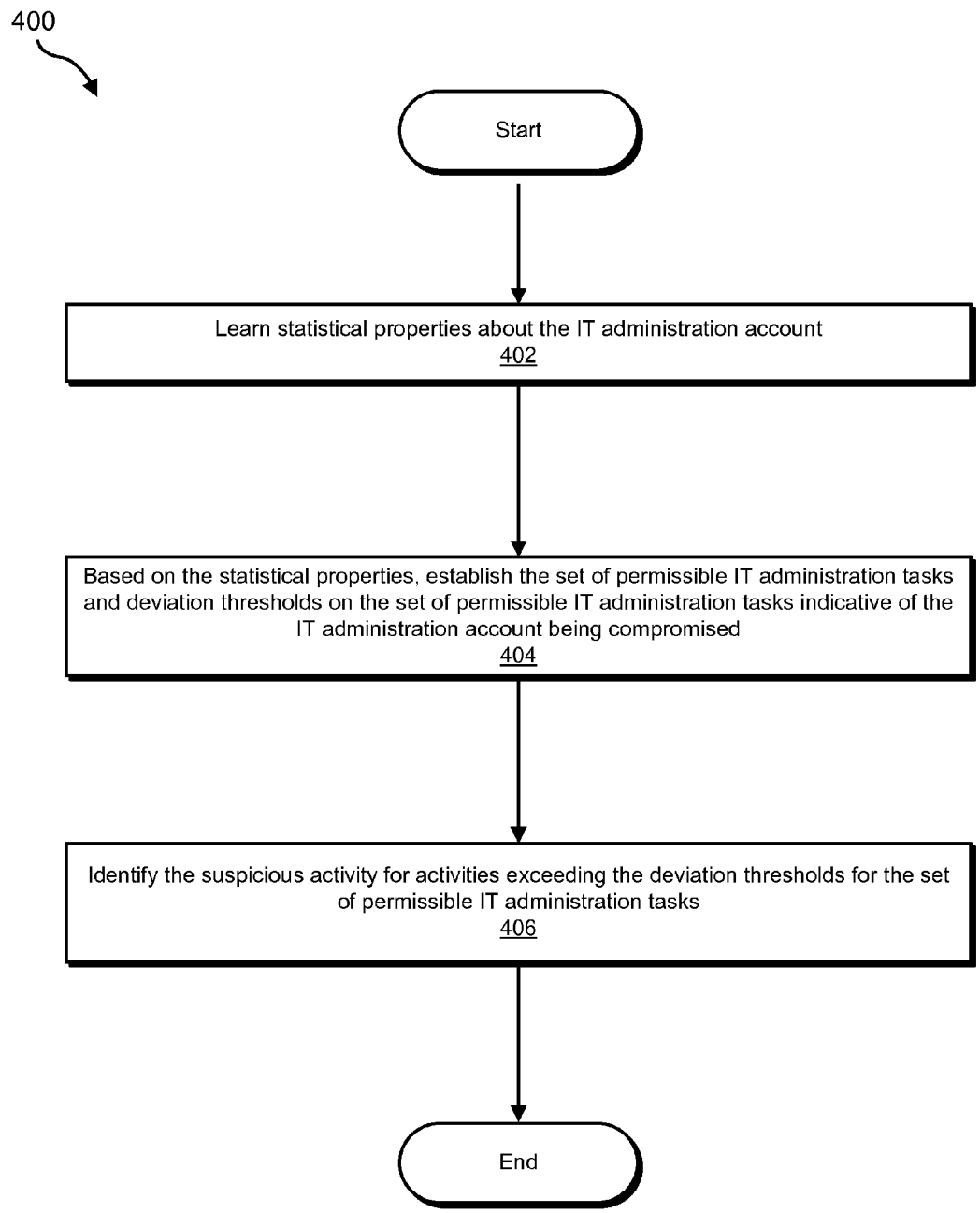
FIG. 4 is a flow diagram of an exemplary method for establishing the set of permissible IT administration tasks and detecting a suspicious activity.

In some examples, the systems and methods described herein may dynamically establish a set of permissible IT administration tasks and detect the suspicious activity based on the set of dynamically established permissible IT administration tasks. FIG. 4 is a flow diagram of an exemplary computer-implemented method 400 for establishing a set of permissible IT administration tasks and detecting a suspicious activity based on a set of permissible IT administration tasks. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 610 in FIG. 6, and/or portions of exemplary network architecture 700 in FIG. 7.

As illustrated in FIG. 4, at step 402, one or more of the systems described herein may learn statistical properties about the IT administration account. In some examples, the statistical properties may include a number of logins per day into the IT administration account, times of day of the logins occur, a set of geographical locations of the logins, a number of machines accessed per day by the IT administration account, a volume of hypertext transfer protocol (HTTP) traffic from the IT administration account, and/or a set of applications, tools, and/or commands used by an IT administrator on the IT administration account. In some examples, the statistical properties may provide accumulated information on legitimate IT administrator tasks on a type of IT administration account.

At step 404, one or more of the systems described herein may, based on the statistical properties, establish the set of permissible IT administration tasks and deviation thresholds on a set of permissible IT administration tasks indicative of an IT administration account being compromised. For example, a number of activities below a deviation threshold may be categorized as permissible IT administration tasks, but once a number of activities exceeds a deviation threshold, these additional activities may be identified as suspicious activities.

At step 406, one or more of the systems described herein may identify a suspicious activity for activities exceeding deviation thresholds for a set of permissible IT administration tasks. For example, if a statistical property is a number of machines accessed per day by an IT administration account, a deviation threshold for a number of machines accessed per day by an authorized IT administrator based on historical data may be determined to be 20 machines accessed per day. A suspicious activity may then be identified when a number of machines accessed per day exceeds 20 machines (i.e., the deviation threshold).

Returning to FIG. 3, at step 304 one or more of the systems described herein may monitor an IT administration account for activities outside a set of permissible IT administration tasks. For example, monitoring module 106 may, as part of server 206 and/or computing devices 202(1)-(N) in FIG. 2, monitor IT administration account 222 for activities outside set of permissible IT administration tasks 224. In some examples, activity-collecting modules 210(1)-(N) on computing devices 202(1)-(N) may be used to monitor IT administration account 222 on various computing devices 202(1)-(N) in network 204. Activity-collecting modules 210(1)-(N) may act as agents on computing devices 202(1)-(N) for monitoring module 106 and may exchange data with monitoring module 106.

The term "activities" and the phrase "monitored activities" generally refer to tasks, commands, applications, and/or tools executed or accessed on an account, such as an IT administration account or a user account. For example, activities may include accessing, reading, copying, downloading, and/or composing a document (e.g., email). Additionally, activities may include remote logging into another computing device and/or machine, creating regular and temporary accounts, raising and/or changing a privilege level of a user, clearing event logs, and/or resetting passwords of users. Monitoring module 106 may identify activities on one or more computing devices, and the identified activities may be within and/or outside the set of permissible IT administration tasks. Activities within a set of permissible IT administration tasks may be indicative of legitimate IT administrator use. Activities outside a set of permissible IT administration tasks may be indicative of suspicious activity or misuse that may be performed by an attacker to compromise an IT administration account and gain access to a network and/or enterprise resources.

Returning to FIG. 3, at step 306 one or more of the systems described herein may detect a suspicious activity by identifying an activity that is outside a set of permissible IT administration tasks, which may be indicative of an IT administration account being compromised. For example, detection module 108 may, as part of server 206 and/or computing devices 202(1)-(N) in FIG. 2, detect suspicious activity 226 by identifying an activity that is outside set of permissible IT administration tasks 224 and therefore indicative of an IT administration account 222 being compromised.

The phrase "suspicious activity" and the term "anomaly," as used herein, generally refer to any tasks, commands, applications and/or tools executed using an IT administration account that are not normally performed as part of IT administration tasks and/or are not legitimate IT administration tasks. In some examples, a suspicious activity and/or suspicious behavior may be defined as activity that is outside a set of permissible IT administration tasks. In some examples, a suspicious activity may include accessing, copying, or downloading a confidential document and/or source-code, reading an email, composing a document, and/or accessing the Internet. Additionally, a suspicious activity may include remote accessing another computing device from a non-administrator computing device, creating a temporary account, changing a privilege level of another user, clearing an event log, and/or resetting passwords of other users. A suspicious activity may be a deviation from a statically or dynamically constructed list of activities based on historical behavior of authorized IT administrators used to establish a set of permissible IT administration tasks.

Various commands and tasks monitored on an IT administration account may be compared to a set of permissible IT administration tasks in order to detect a suspicious activity. In some examples, monitoring module 106 may identify commands and tasks executed on an IT administration account. Detection module 108 may compare identified commands against a set of permissible IT administration tasks. When a set of permissible IT administration tasks includes a white list of permissible IT administration tasks, detection module 108 may determine that a command or a task is a suspicious activity if a command or a task is not listed on white list. When a set of permissible IT administration tasks includes a blacklist of impermissible IT administration tasks, detection module 108 may determine that a command or a task is a suspicious activity if a command or a task is listed on blacklist.

For example, monitoring module 106 may identify a clear event log command and an endpoint configuration script task. For a particular computing device and/or a particular IT administration account, a clear event log command may be an impermissible IT administration task that is not within a set of permissible IT administration tasks, while an endpoint configuration script task may be a permissible IT administration task within the a set of permissible IT administration tasks. A clear event log command may be detected as a suspicious activity, while an endpoint configuration script task may not be considered a suspicious activity. Detection of a suspicious activity may then trigger a security action.

Returning to FIG. 3, at step 308 one or more of the systems described herein may, in response to detecting a suspicious activity, perform or trigger a security action with respect to a potentially compromised IT administration account. For example, security action module 110 may, as part of server 206 and/or computing devices 202(1)-(N) in FIG. 2, perform security action 228 with respect to potentially compromised IT administration account 222.

Security action module 110 may perform any suitable type or form of security action. For example, security action module 110 may notify at least one IT administrator of a suspicious activity on an IT administration account, may log and/or monitor a suspicious activity on an IT administration account, may block the suspicious activity on an IT administration account, and/or may lock out an IT administration account from further use in an attempt to protect enterprise resources from a potentially compromised IT administration account. Additionally or alternatively, security action module 110 may log a suspicious activity for a potentially compromised IT administration account on a profiling server and/or block execution of a suspicious activity.

Security action module 110 may lock out an IT administration account at various levels of granularity. For example, a finer granularity on locking out an IT administration account may include locking out an IT administration account at a particular computing device, at a type of computing device, and/or at a location of the computing device. With a finer granularity on locking out an IT administration account, an IT administration account may deny access from a particular computing device, a type of computing device, and/or a location of the computing device while still granting access to the IT administration account from another particular computing device, another type of computing device, and/or another location of the computing device. A rough granularity may include locking out an IT administration account for all activity on an IT administration account such that all access to an IT administration account is denied regardless of a particular computing device used, a type of computing device used, and/or a location of the computing device used.

A suspicious activity may be blocked before potential harm may occur on an IT administration account. For example, monitoring module 104 may monitor an IT administration account as in step 304, detection module 106 may detect a suspicious activity as in step 306, and/or security action module 110 may perform a security action as in step 308 before activities that can potentially compromise the IT administration account are completed. Blocking suspicious activities may restrict or prevent misuse of enterprise resources. In another example, a user of an IT administration account can request to perform a task and/or command using tool and/or application, but prior to executing that task and/or command, security action module 110 may block a task and/or command as part of a security action. In some examples, when a security action is triggered, a request to perform a task and/or command may not be executed.

In some examples, the systems and methods described herein may include additional safeguards to an IT administration account, such as changing credentials of an IT administration account or a personal user account for an IT administrator. For example, when an IT administrator's IT administration account credentials match an IT administrator's non-administrator account credentials (e.g., an IT administrator's personal user account username and/or password), a non-administrator account credentials may also become a target for attackers.

Figure 5:
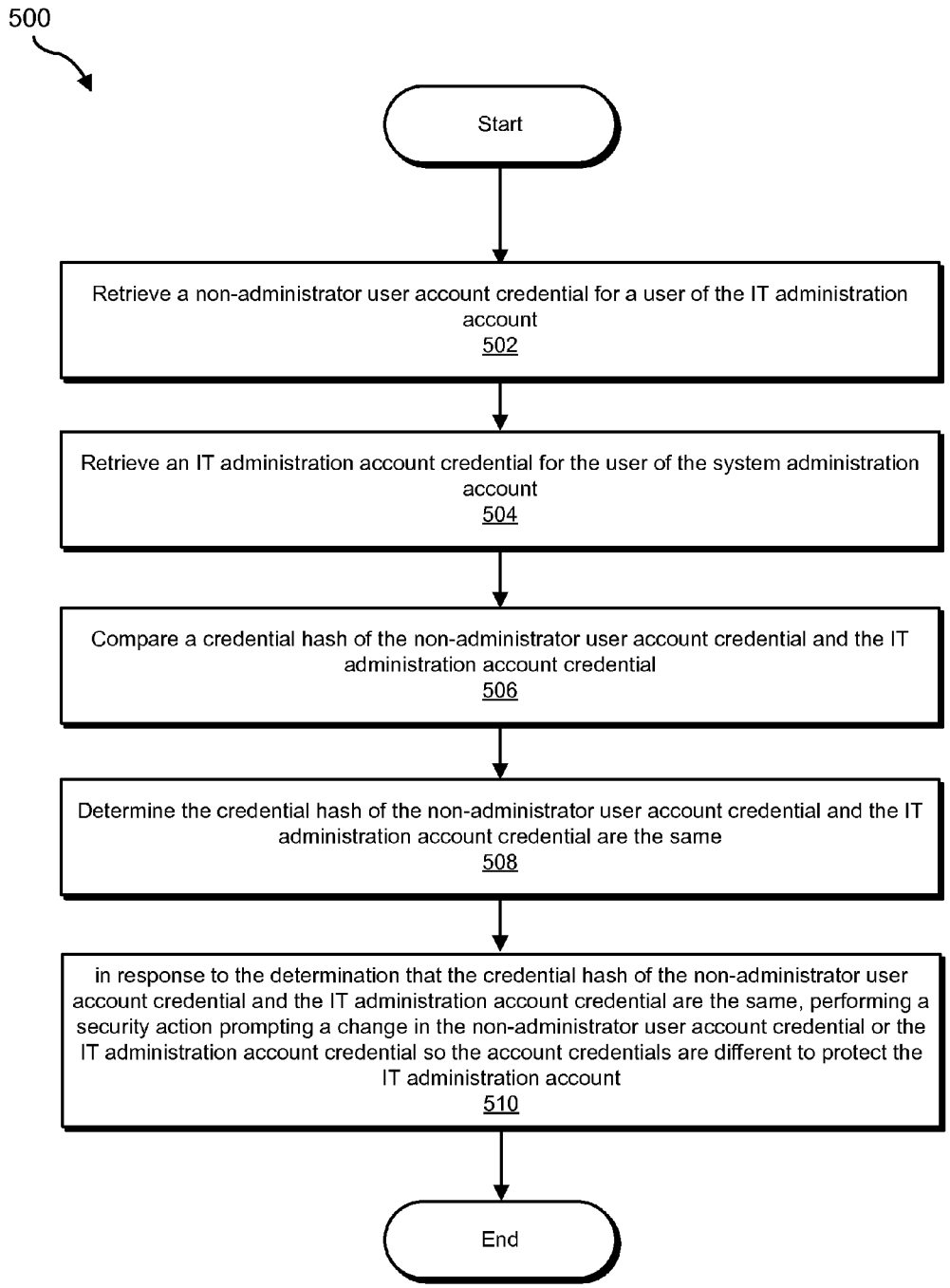
FIG. 5 is a flow diagram of an exemplary method for comparing non-administrator user account credentials with IT administration account credentials.

FIG. 5 is a flow diagram of an exemplary computer-implemented method 500 for comparing non-administrator user account credentials with IT administration account credentials and changing at least one of the credentials when account credentials are the same or similar. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 610 in FIG. 6, and/or portions of exemplary network architecture 700 in FIG. 7.

As illustrated in FIG. 5, at step 502, one or more of the systems described herein may retrieve a non-administrator user account credential for a user of an IT administration account. At step 504, one or more of the systems described herein may retrieve an IT administration account credential for the user of the system administration account. The phrase "account credential," generally refers to any username, password, biometric identifier, and/or other identifier that can uniquely and/or securely identify a user (e.g., an IT administrator), which can be used to access an account (e.g., an IT administration account) in an enterprise or community. One or more of the systems may return a non-administrator user account credential and/or an IT administration account credential as a hash or credential hash. A hash function may map data of arbitrary length (e.g., account credential) to data of a fixed length, which fixed length data may be compared with each other. The values or data returned by a hash function may be referred to as hashes.

At step 506, one or more of the systems described herein may compare a non-administrator user account credential with an IT administration account credential. For example, a non-administrator user account credential hash may be compared with an IT administration account credential hash. The credential hash may be a salted or non-salted hash. In cryptography, a salt may be random data that is used as an additional input to a one-way function that hashes a password, passphrase, and/or other credential. Salts may be used to defend against dictionary attacks and pre-computed rainbow table attacks. A new salt may be randomly generated for each password. In some examples, a salt and a password may be concatenated and processed with a cryptographic hash function, and a resulting output may be stored with a salt in a database. Hashing allows for later authentication while defending against compromise of a plaintext password in the event that a database is somehow compromised. Due to additional data in a salted hash, a comparison of non-salted credential hashes of a non-administrator user account credential with an IT administration account credential may be easier to perform than a comparison of salted credential hashes.

At step 508, one or more of the systems described herein may determine that a credential hash of a non-administrator user account credential and a credential hash of an IT administration account credential are the same. At step 510, one or more of the systems described herein may, in response to a determination that a credential hash of a non-administrator user account credential and a IT administration account credential are the same, perform a security action prompting a change in a non-administrator user account credential or an IT administration account credential so account credentials are different to further protect an IT administration account from an attack. Changing credentials of an IT administration account or a personal user account for an IT administrator is illustrated as just one example of a safeguard to an IT administration account.

As discussed above, the systems and methods described here may detect and block attacks on IT administration accounts prior to (or during) misuse or malicious activity on an IT administration account. Detection and/or correction of a compromised IT administration account during an attack can reduce time and resources to repair the damage due to an attack. Additionally, IT administration accounts may restrict activities to those activities used to actually support IT administration tasks in an IT administrator's job function. The system and methods described herein may also provide security hardening of IT administration accounts.

Figure 6:
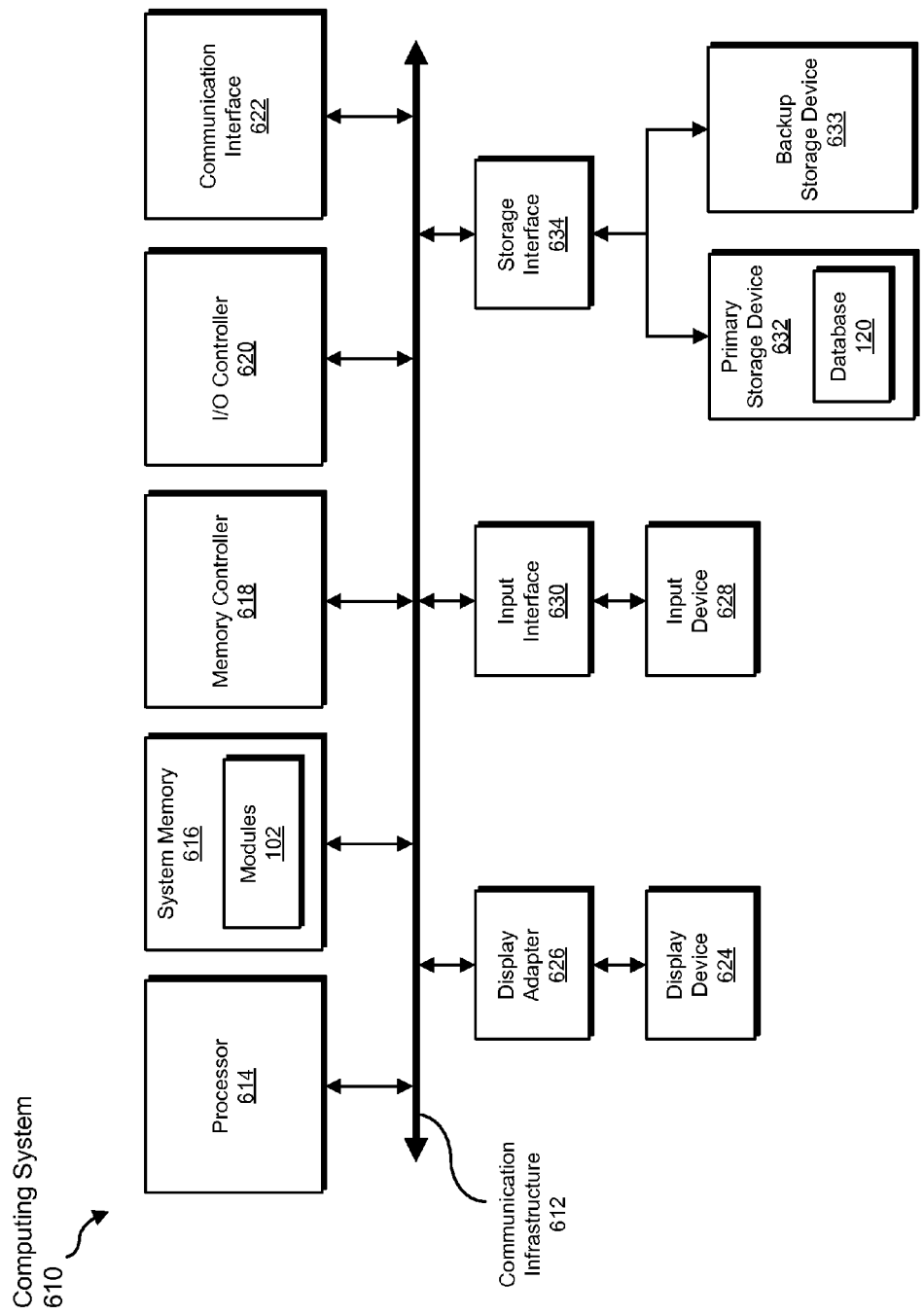
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
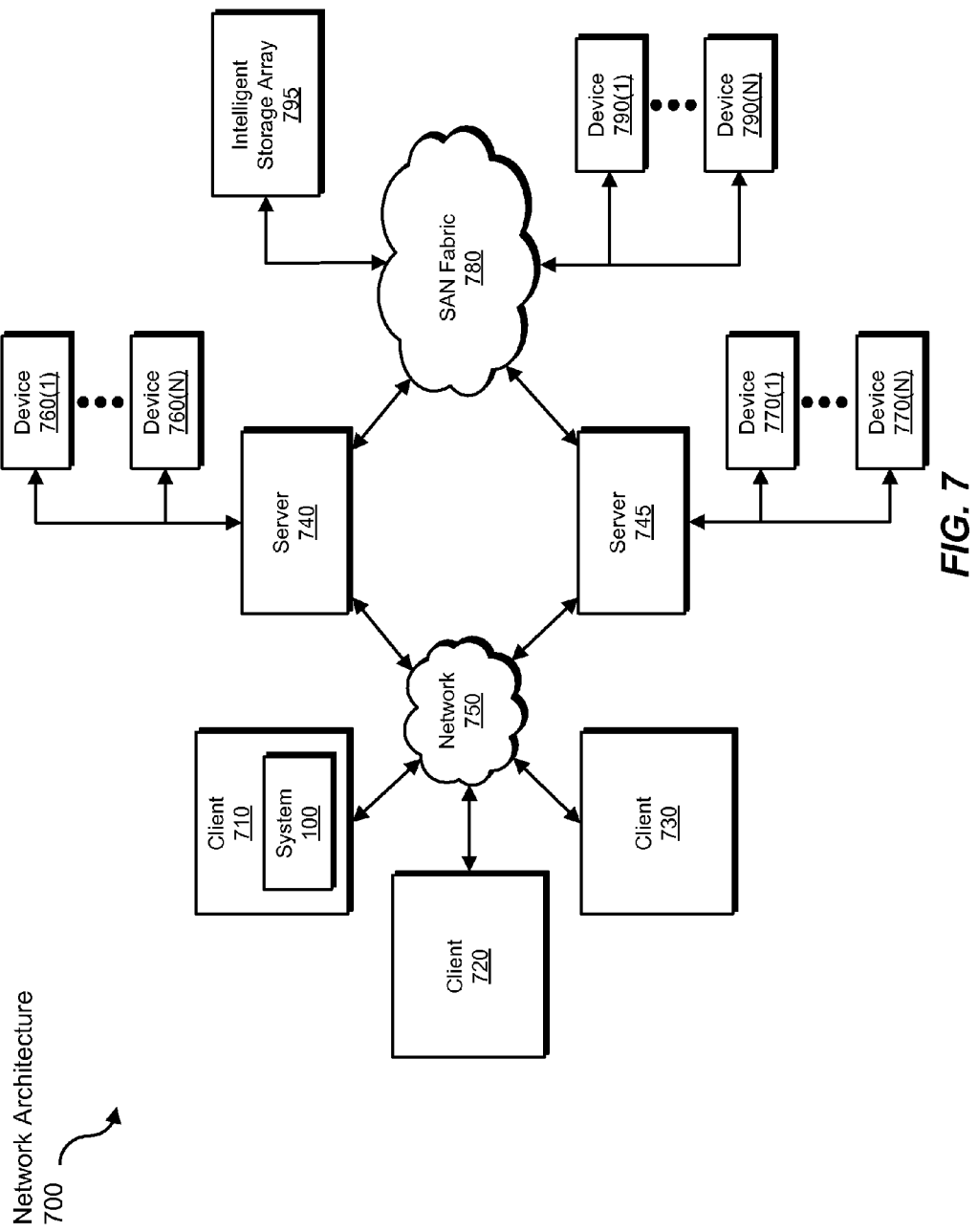
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for anomaly-based detection of compromised IT administration accounts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a monitored activity that is outside the set of permissible IT administration tasks to be transformed, transform the activity to a suspicious activity indicative of the IT administration account being compromised, output a security action to inform an IT administrator of the potentially compromised IT administration account and/or limit access to the potentially compromised IT administration account, use the result of the transformation to protect the potentially compromised IT administration account from an attacker, and store the result of the transformation to a profiler server or other storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for anomaly-based detection of compromised information technology (IT) administration accounts, at least a portion of the method being performed by a computing device comprising at least one processor, the method comprising:
    establishing a set of permissible IT administration tasks for an IT administration account by statically establishing a predefined white list of tasks that are not indicative of suspicious activities on an IT administration account, wherein establishing the predefined white list of tasks comprises defining, for one or more permissible IT administration tasks in the set of permissible IT administration tasks, at least one of:
        a time of day the task is permissible;
        a location where the task is permissible; and
        a first type of computing device permitted to perform the task;
    monitoring the IT administration account for activities outside the set of permissible IT administration tasks;
    detecting a suspicious activity by identifying an activity that is outside the set of permissible IT administration tasks and therefore indicative of the IT administration account being compromised; and
    in response to detecting the suspicious activity, performing, by a security action module on the computing device that is programmed to respond to the suspicious activity, a security action that comprises locking out the IT administration account at a second type of computing device while still granting access to the IT administration account on the first type of computing device.

2. The computer-implemented method of claim 1, wherein:
    the IT administration account includes a domain administrator account;
    the predefined white list of tasks includes at least one of:
        managing domain credentials; and
        creating and/or modifying domain accounts.

3. The computer-implemented method of claim 1, wherein:
    the IT administration account includes a local administrator account;

the predefined white list of tasks includes at least one of:
   installing software; and
   creating and/or modifying local accounts.

4. The computer-implemented method of claim 1, wherein establishing the predefined white list of tasks comprises:
   determining suspicious activities on the IT administration account that can compromise the IT administration account; and
   excluding the suspicious activities from the set of permissible IT administration tasks for the IT administration account.

5. The computer-implemented method of claim 1, wherein:
   the first type of computing device comprises an administrator computing device; and
   the second type of computing device comprises a non-administrator computing device.

6. The computer-implemented method of claim 1, wherein:
   establishing the predefined white list of tasks comprises categorizing tasks by the types of computing devices used by the IT administrator;
   categorizing tasks by the types of computing devices used by the IT administrator comprises categorizing the first type of computing device as an administrator computing device used for administrative tasks and categorizing the second type of computing device as a non-administrator computing device used for non-administrative tasks.

7. The computer-implemented method of claim 1, wherein monitoring the IT administration account, detecting the suspicious activity, and/or performing the security action comprises:
   performing the security action prior to executing the activities that can potentially compromise the IT administration account.

8. The computer-implemented method of claim 1, wherein: the IT administration account includes at least one of:
   a local administrator account, where the set of permissible IT administration tasks includes tasks for managing an endpoint device; and
   a domain administrator account, where the set of permissible IT administration tasks includes tasks for:
      managing a website; and
      managing a network.

9. The computer-implemented method of claim 1, wherein the set of permissible IT administration tasks performed using the IT administration account differs from other activities performed using a personal user account.

10. The computer-implemented method of claim 1, further comprising:
   retrieving a non-administrator user account credential for a user of the IT administration account;
   retrieving an IT administration account credential for the user of the IT administration account;
   comparing a credential hash of the non-administrator user account credential with a credential hash of the IT administration account credential;
   determining the credential hash of the non-administrator user account credential and the credential hash of the IT administration account credential are the same; and
   in response to the determination that the credential hashes of the non-administrator user account credential and the IT administration account credential are the same, performing a security action prompting a change in the non-administrator user account credential or the IT administration account credential so the account credentials are different to protect the IT administration account.

11. The computer-implemented method of claim 1, wherein the activity that is outside the set of permissible IT administration tasks further comprises at least one of:
   accessing, copying, and/or downloading source-code;
   reading an email;
   composing a document;
   accessing the Internet;
   remote accessing another computing device from a non-administrator computing device;
   creating a temporary account and/or a temporary user account;
   raising and/or changing a privilege level of another user;
   clearing an event log; and
   resetting passwords of other users.

12. The computer-implemented method of claim 1, wherein:
   the IT administration account includes at least one of: a network administrator account, a system administrator account, a database administrator account, and/or a backup administrator account; and
   the predefined white list of tasks includes at least one of: modifying new user accounts, creating new user accounts, host administration, network administration, maintaining network resources, and/or hosting a website.

13. A system for anomaly-based detection of compromised information technology (IT) administration accounts, the system comprising:
   an establishing module, stored in memory, that establishes a set of permissible IT administration tasks for an IT administration account by statically establishing a predefined white list of tasks that are not indicative of suspicious activities on an IT administration account, wherein establishing the predefined white list of tasks comprises defining, for one or more permissible IT administration tasks in the set of permissible IT administration tasks, at least one of:
      a time of day the task is permissible;
      a location where the task is permissible; and
      a first type of computing device permitted to perform the task;
   a monitoring module, stored in memory, that monitors the IT administration account for activities outside the set of permissible IT administration tasks;
   a detection module, stored in memory, that detects a suspicious activity by identifying an activity that is outside the set of permissible IT administration tasks and therefore indicative of the IT administration account being compromised;
   a security action module, stored in memory, that in response to detecting the suspicious activity, performs a security action that comprises locking out the IT administration account at a second type of computing device while still granting access to the IT administration account on the first type of computing device; and
   at least one physical processor that executes the establishing module, the monitoring module, the detection module, and the security action module.

14. The system of claim 13, wherein:
   the IT administration account includes a domain administrator account;
   the predefined white list of tasks includes at least one of:
      managing domain credentials; and
      creating and/or modifying domain accounts.

15. The system of claim 13, wherein:
the IT administration account includes a local administrator account;
the predefined white list of tasks includes at least one of:
installing software; and
creating and/or modifying local accounts.

16. The system of claim 13, wherein the establishing module establishes the predefined white list of tasks for the IT administration account by categorizing tasks by the types of computing devices used by an IT administrator.

17. The system of claim 13, wherein the set of permissible IT administration tasks performed using the IT administration account differs from other activities performed using a personal user account.

18. The system of claim 13, wherein the security action module performs a security action by:
retrieving a non-administrator user account credential for a user of the IT administration account;
retrieving an IT administration account credential for the user of the IT administration account;
comparing a credential hash of the non-administrator user account credential with a credential hash of the IT administration account credential;
determining the credential hash of the non-administrator user account credential and the credential hash of the IT administration account credential are the same; and
in response to the determination that the credential hashes of the non-administrator user account credential and the IT administration account credential are the same, performing a security action prompting a change in the non-administrator user account credential or the IT administration account credential so the account credentials are different to protect the IT administration account.

19. The system of claim 13, wherein the activity that is outside the set of permissible IT administration tasks further comprises at least one of:
accessing, copying, or downloading source-code;
reading an email;
composing a document;
accessing the Internet;
remote accessing another computing device from a non-administrator computing device;
creating a temporary account and/or a temporary user account;
raising and/or changing a privilege level of another user;
clearing an event log; and
resetting passwords of other users.

20. A non-transitory computer-readable medium comprising one or more computer-executable instructions that, when executed by at least one processor of a computing device, cause the computing device to:
establish a set of permissible information technology (IT) administration tasks for an IT administration account by statically establishing a predefined white list of tasks that are not indicative of suspicious activities on an IT administration account, wherein establishing the predefined white list of tasks comprises defining, for one or more permissible IT administration tasks in the set of permissible IT administration tasks, at least one of:
a time of day the task is permissible;
a location where the task is permissible; and
a first type of computing device permitted to perform the task;
monitor the IT administration account for activities outside the set of permissible IT administration tasks;
detect a suspicious activity by identifying an activity that is outside the set of permissible IT administration tasks and therefore indicative of the IT administration account being compromised; and
in response to detecting the suspicious activity, perform a security action that comprises locking out the IT administration account at a second type of computing device while still granting access to the IT administration account on the first type of computing device.

* * * * *